(12) United States Patent
Alagar et al.

(10) Patent No.: US 11,657,168 B2
(45) Date of Patent: *May 23, 2023

(54) ERROR DETECTION OF DATA LEAKAGE IN A DATA PROCESSING SYSTEM

(71) Applicant: Bank of America Corporation, Charlotte, NC (US)

(72) Inventors: Ramesh Alagar, Tamil Nadu (IN); Prabakar Rangarajan, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 288 days.

This patent is subject to a terminal disclaimer.

(21) Appl. No.: 17/106,421

(22) Filed: Nov. 30, 2020

(65) Prior Publication Data

US 2021/0081554 A1 Mar. 18, 2021

Related U.S. Application Data

(63) Continuation of application No. 16/111,438, filed on Aug. 24, 2018, now Pat. No. 10,853,509.

(51) Int. Cl.
*G06F 21/00* (2013.01)
*G06F 21/62* (2013.01)
*G06F 16/28* (2019.01)
*G06F 16/951* (2019.01)
*G06F 16/23* (2019.01)

(52) U.S. Cl.
CPC .......... *G06F 21/62* (2013.01); *G06F 16/2365* (2019.01); *G06F 16/285* (2019.01); *G06F 16/951* (2019.01)

(58) Field of Classification Search
CPC .... G06F 21/62; G06F 16/285; G06F 16/2365; G06F 16/951
See application file for complete search history.

(56) References Cited

U.S. PATENT DOCUMENTS

| | | |
|---|---|---|
| 7,827,608 B2 | 11/2010 | Bird et al. |
| 8,776,017 B2 | 7/2014 | Perlmutter et al. |
| 8,893,300 B2 | 11/2014 | Ramachandran et al. |
| 8,978,092 B2 | 3/2015 | Balinsky et al. |
| 9,189,377 B1 | 11/2015 | Arkadyev |
| 9,219,752 B2 | 12/2015 | Balinsky et al. |
| 9,934,542 B2 | 4/2018 | Chauhan et al. |
| 10,587,671 B2* | 3/2020 | Verma .................... G06F 16/951 |
| 2012/0137367 A1* | 5/2012 | Dupont ................... G06F 21/00 726/25 |
| 2016/0234167 A1* | 8/2016 | Engel .................. H04L 63/1408 |

(Continued)

*Primary Examiner* — Joseph P Hirl
*Assistant Examiner* — Chi D Nguy

(57) ABSTRACT

A system for detecting data leakage is disclosed. The system intercepts web traffic data, de-duplicates the web traffic data, and extracts data elements from the web traffic data. The system further groups the data elements into multiple clusters based on data types associated with the data elements. The system then identifies data elements in a cluster that were previously sent to a user and identifies allowed data elements from an allow table that are supposed to be sent to the user. The system determines whether there is a data leakage by determining whether the identified data elements in the cluster comprises at least one data element that is not in the identified allowed data elements in the allow table.

20 Claims, 7 Drawing Sheets

(56) References Cited

U.S. PATENT DOCUMENTS

| | | | |
|---|---|---|---|
| 2019/0012476 A1* | 1/2019 | Dorogoy | G06F 21/60 |
| 2019/0228186 A1* | 7/2019 | Atreya | G06F 21/556 |
| 2020/0065504 A1 | 2/2020 | Alagar et al. | |

* cited by examiner

| Supplier invoices 145 | Buyer 1 110 | Buyer 2 110 | Supplier 3 110 |
|---|---|---|---|
| B1S1-INV01 | ✓ | ✗ | ✗ |
| B1S2-INV02 | ✓ | ✗ | ✗ |
| B1S3-INV03 | ✓ | ✗ | ✓ |
| B2S3-INV04 | ✗ | ✓ | ✓ |
| B2S4-INV05 | ✗ | ✓ | ✗ |
| B2S5-INV06 | ✗ | ✓ | ✗ |

*FIG. 2*

| Rule name 302 | Data element ID 304 | Whitelisted data 306 |
|---|---|---|
| Viewable_Invoice | Invoice ID | Select allowed invoices from invoice allow table for logged in user |
| Viewable_Purchase_Order | Purchase order ID | Select allowed purchase orders from purchase order allow table for logged in user |
| Viewable_Shipping_Doc | Shipping document ID | Select allowed shipping documents from shipping document allow table for logged in user |

ERROR DETECTION OF DATA LEAKAGE IN A DATA PROCESSING SYSTEM

CROSS-REFERENCE TO RELATED APPLICATIONS

This application is a continuation of U.S. patent application Ser. No. 16/111,438 filed Aug. 24, 2018, by Ramesh Alagar et al., and entitled "ERROR DETECTION OF DATA LEAKAGE IN A DATA PROCESSING SYSTEM," which is incorporated herein by reference.

TECHNICAL FIELD

This disclosure relates generally to data leakage, and more particularly to a system for performing error detection of data leakage in a data processing system.

BACKGROUND

In the digital era, data has become one of the most critical components of an enterprise. As the volume of data is growing exponentially and data breaches are happening more frequently than ever before, detecting and preventing data loss and leakage has become one of the most pressing security concerns for enterprises.

It is challenging for enterprises to protect data against information leakage in the era of big data. As data becomes one of the most critical components of an enterprise, managing and analyzing large amounts of data provides an enormous competitive advantage for enterprises. However, it also puts sensitive and valuable enterprise data at risk of loss or theft and poses significant security challenges to enterprises. The need to store, process, and analyze more and more data together with the high utilization of modern communication channels in enterprises results in an increase of possible data leakage vectors, including cloud file sharing, email, web pages, instant messaging, FTP (file transfer protocol), removable media/storage, database/file system vulnerability, camera, laptop theft, backup being lost or stolen, and social networks.

Data leakage detection faces the following technical challenges. (1) Scalability: the ability to process large content, e.g., megabytes to terabytes, and to be deployed in distributed environments. Scalability is the key to efficiently processing massive enterprise-scale amounts of data. A scalable solution can also reduce the data processing delay and achieve early data leakage detection. (2) Privacy preservation: the ability to preserve the confidentiality of sensitive data. (3) Accuracy: achieving low false negative/positive rates for the detection. The distributed nature of big data environments poses a challenge in accurate leakage detection. (4) Timeliness: immediately detect and respond to data leakage before they cause damage. The volume, variety, and velocity of big data bring both opportunities and challenges for nearly real-time identifying data leakage threats.

SUMMARY

A purpose of data leakage detection is to identify, monitor, and prevent unintentional or deliberate exposure of sensitive information in an enterprise environment.

Data leakage can be caused by internal and external information breaches, either intentionally (e.g., data theft by intruders or sabotage by insider attackers) or accidentally (e.g., accidental disclosure of sensitive information by employees and partners). Intentional data leakage includes many forms including phishing, cross-site scripting, and SQL injection are covered under Common Weakness Enumeration (CWE). There are many existing tools that are available for simulating and detecting intentional data leakage issues. Accidental data leakages are caused either due to data transmission/storage to unauthorized device or improper data retrieval criteria in code. There are no existing tools that are available to detect data leakages caused by improper data retrieval criteria in code. These accidental data leakage issues are referred to as programmatically introduced accidental data leak (PIADL) in the present disclosure.

Detection of the PIADL faces many technical challenges including scalability, privacy preservation, accuracy, and timeliness. The present disclosure discloses a system to address these technical challenges. Specifically, the disclosed system is configured to intercept web traffic data including HTTP requests and responses, de-duplicate the web traffic data, and cluster the de-duplicated web traffic data. De-duplicating and clustering the web traffic data reduces the amount of data that will be transmitted in and processed by the system. For example, de-duplicating the web traffic data involves removing duplicate copies of repeating data, thereby significantly reducing the amount of data to be transmitted over the network and to be processed by the disclosed system. This approach will reduce the strain on the network and alleviate any network bottlenecks. It will also reduce the amount of read and write operations on the memory space of the computers that implement the disclosed system, thereby reducing the burden on the memory space of the computers and improving the performance of the computers and the overall system. This increases the efficiency of the system to process a large volume of web traffic data, thereby increasing the scalability of the system.

Furthermore, the disclosed system is configured to apply a set of rules in a rule table to the web traffic data and determine whether the web traffic data associated with a user includes data that is not supposed to be sent to the user. The rules are applied to the web traffic data in the form of a series of steps/operations as discussed below. Specifically, in one embodiment, the disclosed system is configured to pre-store a plurality of allow tables. Each allow table includes a plurality of allowed data elements of a pre-defined data type that are associated with a plurality of users. Each user in an allow table is associated with a subset of the allowed data elements in the allow table. The system intercepts the web traffic data and de-duplicates the web traffic data to extract a plurality of data elements from the web traffic data. Each of the data elements is associated with a pre-defined data type. The system further segregates the plurality of data elements into a plurality of clusters based on the data types associated with the data elements so that each cluster corresponds to a pre-defined data type.

Then, the system determines whether there is a data leakage in each of the clusters. Specifically, the system identifies a first cluster of data elements associated with a first pre-defined data type and identifies data elements in the first cluster that are associated with a first user. The system further identifies a first allow table that is associated with the first pre-defined data type and identifies allowed data elements in the first allow table that are associated with the first user. The system then compares the identified data elements in the first cluster to the identified allowed data elements in the first allow table and determines whether the identified data elements in the first cluster comprises at least one data element that is not in the identified allowed data elements in the first allow table. In response to determining that the identified data elements in the first cluster comprises at least one data element that is not in the identified allowed data elements in the first allow table, the system determines that an error of data leakage is detected for the first user within the first pre-defined data type.

The above-discussed steps/operations including identifying the first cluster of data elements associated with the first pre-defined data type, identifying data elements associated with the first user, identifying allowed data elements associated with the first user, and comparing the identified data elements with the identified allowed data elements form a set of rules to determine whether the web traffic data associated with a user include data that is not supposed to be sent to the user. This approach facilitates preserving the confidentiality of the data.

Moreover, the disclosed system is further configured to determine whether a data leakage is a false alarm. Specifically, the disclosed system uses a supervised learning technique to classify whether a data leakage is a false alarm. If the system determines that the data leakage is a false alarm, the system will stop flagging the data leakage as an error. For example, if the data leakage specifies that sending a data element to a user is an error and the system later determines that the data leakage is a false alarm, the system will stop flagging the event of sending the data element to the user as an error of data leakage. Furthermore, the next time that the system detects that the same data element is sent to the same user, the system will not determine that this is an error of data leakage. This approach improves the accuracy of the detection of data leakage.

Last but not the least, the disclosed system is configured to stream the web traffic data in a Kafka framework. The Kafka framework has the capabilities such as high throughput and low latency. By employing the Kafka framework in the disclosed system, the disclosed approach of detecting the data leakage is a nearly real-time procedure for identifying data leakage threats.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which:

FIG. 2 illustrates an exemplary embodiment of an allow table, according to the present disclosure;

FIG. 3 illustrates an exemplary embodiment of a rule table, according to the present disclosure;

DETAILED DESCRIPTION

Figure 1:
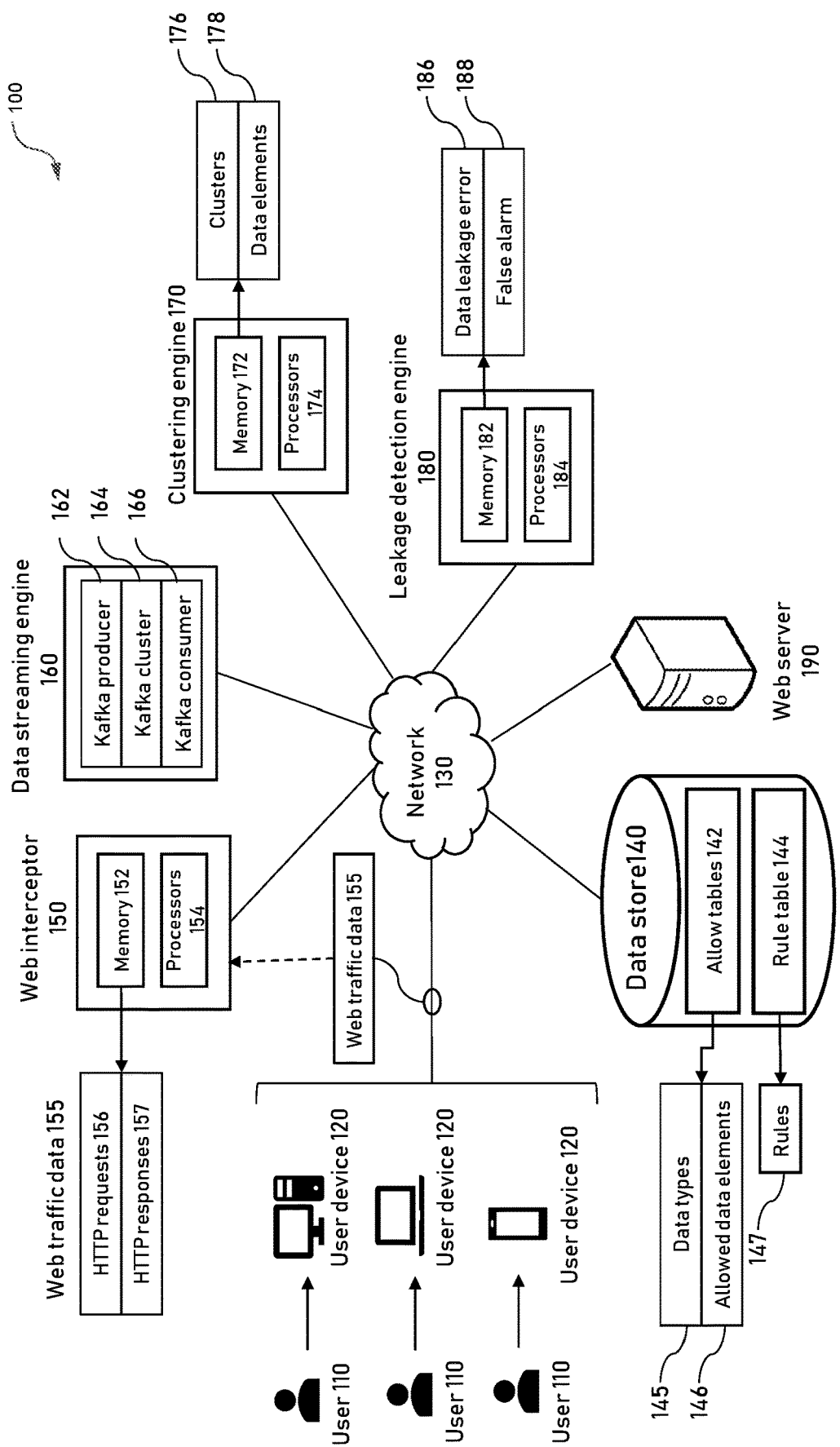
FIG. 1 illustrates an exemplary embodiment of a system for performing error detection of data leakage, according to the present disclosure.

FIG. 1 illustrates an exemplary embodiment of a system 100 for detecting data leakage, according to certain embodiments of the present disclosure. System 100 includes one or more user devices 120, a network 130, a data store 140, a web interceptor 150, a data streaming engine 160, a clustering engine 170, a leakage detection engine 180, and a web server 190.

In general, system 100 intercepts web traffic data 155 transmitted between users 110 and web server 190, de-duplicates the web traffic data 155 into data elements 178, and detects whether the data elements 178 include data that is not supposed to be sent to the users 110. This process is described in detail below.

The disclosed system 100 pre-stores a plurality of allow tables 142 in data store 140. Each allow table 142 includes a plurality of allowed data elements 146 of a pre-defined data type 145 that are associated with a plurality of users 110. Each user 110 in an allow table 142 is associated with a subset of the allowed data elements 146 in the allow table 142. Web interceptor 150 of the system 100 intercepts web traffic data 155. Web traffic data 155 includes HTTP requests 156 and HTTP responses 157 transmitted between user 110 and the web server 190. After intercepting the web traffic data 155, clustering engine 170 de-duplicates the web traffic data 155 and extracts a plurality of data elements 178. Each of the data elements 178 is associated with a pre-defined data type 145. The clustering engine 170 further groups the plurality of data elements 178 into a plurality of clusters 176 based on the data types 145 associated with the data elements 178 so that each cluster 176 corresponds to a pre-defined data type 145.

Then, the system 100 determines whether there is a data leakage error 186 in each of the clusters 176. Specifically, leakage detection engine 180 of the system 100 identifies a first cluster 176 of data elements 178 associated with a first pre-defined data type 145 and identifies data elements 178 in the first cluster 176 that are associated with a first user 110. The leakage detection engine 180 further identifies a first allow table 142 that is associated with the first pre-defined data type 145 and identifies allowed data elements 146 in the first allow table 142 that are associated with the first user 110. The leakage detection engine 180 then compares the identified data elements 178 in the first cluster 176 to the identified allowed data elements 146 in the first allow table 142 and determines whether the identified data elements 178 in the first cluster 176 comprises at least one data element 178 that is not in the identified allowed data elements 146 in the first allow table 142. In response to determining that the identified data elements 178 in the first cluster 176 comprises at least one data element 178 that is not in the identified allowed data elements 146 in the first allow table 142, the leakage detection engine 180 determines that an error of data leakage 186 is detected for the first user 110 within the first cluster 176 of data elements 178 associated with the first pre-defined data type 145.

Users 110 comprise any suitable users including businesses or other commercial organizations, government agencies, and/or individuals. Users 110 may operate on one or more user devices 120 to access system 100.

User devices 120 comprise any suitable devices or machines configured to communicate with other network devices in the system 100. Typically, user device 120 is a data processing system comprising hardware and software that communicates with the other network elements over a network, such as the Internet, an intranet, an extranet, a private network, or any other medium or link. These data processing systems typically include one or more processors, an operating system, one or more applications, and one or more utilities. Applications running on the data processing systems provide native support for web protocols including, but not limited to, support for Hypertext Transfer Protocol (HTTP), Hypertext Markup Language (HTML), and Extensible Markup Language (XML), among others. Examples of user devices 120 include, but are not limited to, desktop computers, mobile phones, tablet computers, and laptop computers.

Network 130 includes any suitable networks operable to support communication between components of system 100. Network 130 may include any type of wired or wireless communication channel capable of coupling together computing nodes. Network 130 may include any interconnecting system capable of transmitting audio, video, electrical signals, optical signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 130 may be configured to support any communication protocols as would be appreciated by one of ordinary skill in the art upon viewing this disclosure.

Data store 140 includes any suitable storage scheme including any software, hardware, firmware, and/or combination thereof capable of storing information. Exemplary data store 140 includes individual data storage devices (e.g., memory, disks, solid-state drives), which may be part of individual storage engines and/or may be separate entities coupled to storage engines. Data store 140 may store third-party databases, database management systems, a file system, and/or other entities that include or that manage data repositories. Data store 140 may be locally located or remotely located to other components of system 100.

As illustrated, in some embodiments, data store 140 is configured to store a plurality of allow tables 142 and a rule table 144. Each of the allow tables 142 includes a plurality of allowed data elements 146 associated with a pre-defined data type 145. Example pre-defined data types include invoices, purchase orders, and shipping documents. Therefore, a first allow table 142 may include allowed data elements 146 comprising invoices, a second allow table 142 may include allowed data elements 146 comprising purchase orders, and a third allow table 142 may include allowed data elements 146 comprising shipping documents. The allowed data elements 146 in an allow table 142 may be associated with a plurality of users 110 so that each user 110 is associated with a subset of the allowed data elements 146 in the allow table 142.

FIG. 2 illustrates an exemplary embodiment of an allow table 142, according to the present disclosure. The allow table 142 is configured with three users 110 and six data elements 146. The users 110 include "buyer 1," "buyer 2," and "supplier 3." The data elements 146 include six invoices each associated with at least one of the users 110. For example, the data element 146 "B1S1-INV01" specifies an invoice associated with the user 110 "buyer 1." As another example, the data element 146 "B1S3-INV03" specifies an invoice associated with the users 110 "buyer 1" and "supplier 3." The allow table 142 is used to determine the data elements 146 that should be sent to the users 110. For example, the allow table 142 shows that the data element 146 "B1S3-INV03" can be sent to the users 110 "buyer 1" and "supplier 3," but not the user 110 "buyer 2." This is because the data element 146 "B1S3-INV03" specifies an invoice associated with the users 110 "buyer 1" and "supplier 3." The data element 146 "B1S3-INV03" may be confidential or sensitive data for the users 110 "buyer 1" and "supplier 3" and the user 110 "buyer 2" should be prevented from accessing it.

Referring back to FIG. 1, data store 140 is further configured to store a rule table 144 comprising a plurality of rules 147 that are designed to identify allowed data elements 146 of a pre-defined data type 145 for a user 110. FIG. 3 illustrates an exemplary embodiment of a rule table 144, according to the present disclosure. The rule table 144 is configured with a first column of rule names 302, a second column of data element IDs 304, and a third column of approved data 306. Each of the rules 147a-c in the rule table 144 includes a rule name 302, a data element ID 304, and approved data 306. For example, the rule 147a includes a rule name 302 "viewable invoice," a data element ID 304 "invoice ID," and approved data 306 "select allowed invoices from invoice allow table for logged in user." The rule 147a is used to identify an allow table 142 that includes invoices, identify the allowed data elements 146 in the allow table 142 that is associated with a user 110 who is logged in to the system 100, and send or display the identified allowed data elements 146 to the user 110. System 100 may apply the rules 147 in the rule table 144 to identify the allowed data elements 146 with each of the pre-defined data types 145 for each of the users 110. After identifying the allowed data elements 146 for a user 110, the system 100 can compare the identified allowed data elements 146 to the data elements 178 that are sent to the user 110 and determine whether there is a data leakage occurring. The determination of a data leakage will be discussed in greater detail below with reference to FIGS. 6-7.

Figure 4:
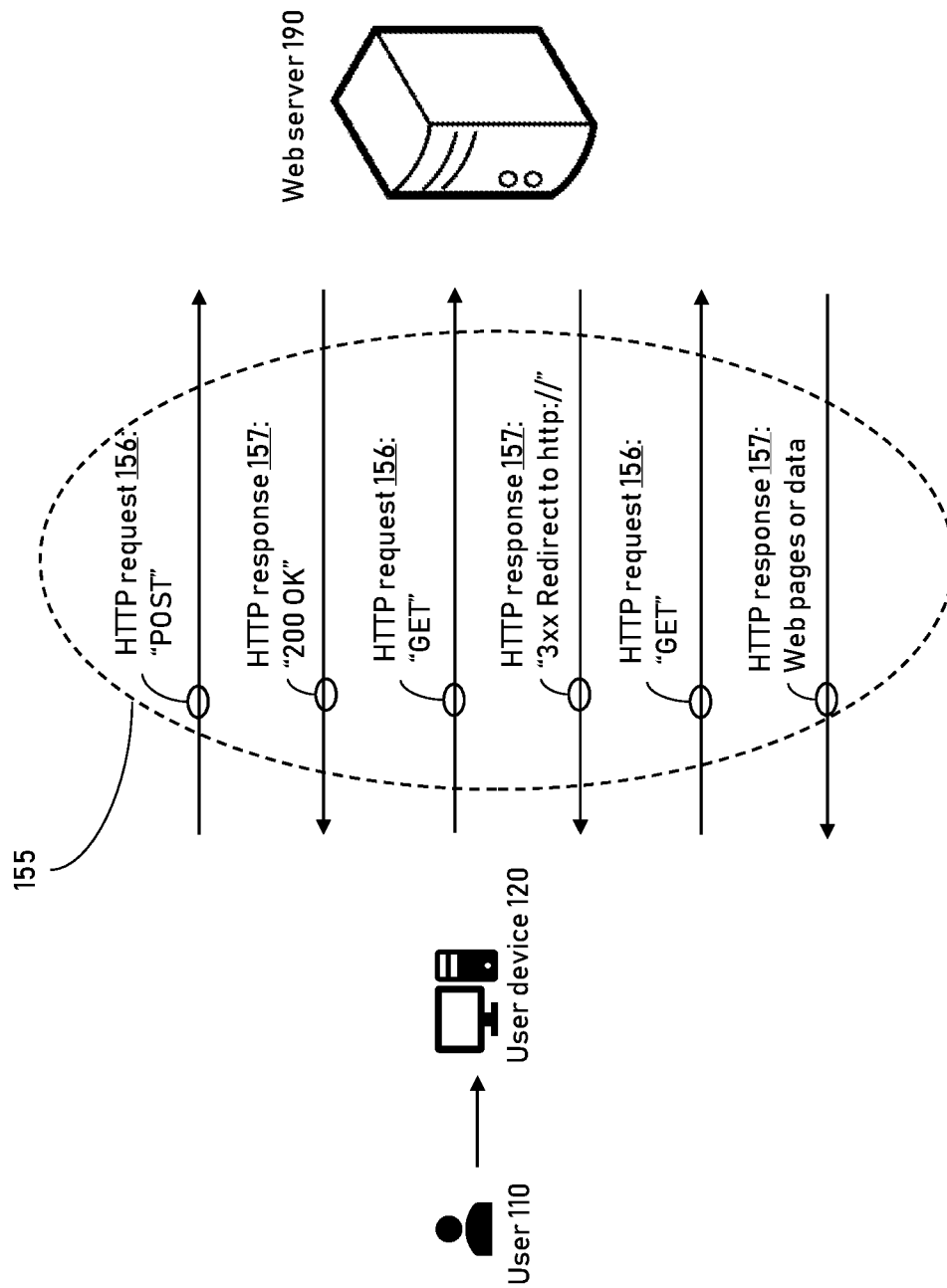
FIG. 4 illustrates an exemplary embodiment of web traffic data, according to the present disclosure.

Referring back to FIG. 1, system 100 further includes a web interceptor 150. Web interceptor 150 is a special purpose computer configured to intercept web traffic data 155 transmitted between users 110 and web server 190. Web interceptor 150 comprises one or more processors 152 and a memory 154 that implement the algorithm discussed herein. In some embodiments, the web traffic data 155 includes HTTP requests 156 and HTTP responses 157. FIG. 4 illustrates an exemplary embodiment of web traffic data 155, according to the present disclosure. As illustrated, a user 110 may operate on a user device 120 to communicate with the web server 190 of the system 100. The user 110 may use the user device 120 to send a series of HTTP requests 156 to the web server 190. In response to the HTTP requests 156, the web server 190 sends a series of HTTP responses 157 to the user device 120. Referring back to FIG. 1, the web traffic data 155 may be intercepted by the web interceptor 150 and stored in the memory 152 for further operations. For example, the web traffic data 155 including the HTTP requests 156 and the HTTP responses 157 may be processed by the clustering engine 170 to extract the data elements 178 as described below in greater detail. The web traffic data 155 may be transmitted from the web interceptor 155 to other components of system 100 within a Kafka framework. For example, system 100 includes a data streaming engine 160 that is implemented in a Kafka framework.

Data streaming engine 160 is a special purpose computer configured to stream the web traffic data 155 that are transmitted between the components of system 100, as discussed herein. As noted above, data streaming engine 160 is implemented in a Kafka framework that includes a Kafka producer 162, a Kafka cluster 164, and a Kafka consumer 166.

In general, a Kafka framework has three key capabilities: (1) it allows a user 110 or a server to publish and subscribe to a stream of records; (2) it allows a user 110 or a server to store streams of records in a fault-tolerant way; and (3) it allows a user 110 or a server to process streams of records as they occur. With these capabilities, a Kafka framework can be used for building real-time streaming data pipelines that reliably get data between systems and applications, and for building real-time streaming applications that transform or react to the stream of data. Therefore, a Kafka framework can be considered as a special purpose distributed file system dedicated to high-performance, low-latency storage, replication, and propagation. Accordingly, the data streaming engine 160 that is implemented in a Kafka framework in the present disclosure achieves a high throughput and low latency design goals. By employing the Kafka framework in the disclosed system 100, the disclosed approach of detecting the data leakage is a nearly real-time procedure for identifying data leakage threats.

Clustering engine 170 is a special purpose computer configured to cluster the web traffic data 155 as discussed herein. Clustering engine 170 comprises one or more processors 172 and a memory 174 that implement the algorithm as discussed herein. Specifically, clustering engine 170 is configured to de-duplicate the web traffic data 155. For example, the clustering engine 170 may extract the data elements 178 from the web traffic data 155 and remove the duplicate copies of the data elements 178. De-duplication improves storage utilization and it also improves the network data transfer by reducing the number of bytes that must be sent. In the de-duplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times, the amount of data that must be stored or transferred can be greatly reduced.

For example, clustering engine 170 may extract a first data element 178, for example such as an invoice, from the web traffic data 155. Clustering engine 170 may store the first data element 178 in the memory 172. Later the clustering engine 170 may extract a second data element 178 from the web traffic data 155. The clustering engine 170 may compare the second data element 178 with the first data element stored in the memory 172 and determine whether they are duplicate copies. If the clustering engine 170 determines that the second data element 178 is a duplicate copy of the first data element 178, the clustering engine 170 may remove the second data element 178. In some embodiments, the clustering engine 170 may store a reference in the memory 172 that refers to the second data element 178. Note that the reference that refers to the second data element 178 is significantly smaller in size compared to the second data element 178. Storing the reference for the second data element or completely removing the second data element 178 reduces the amount of data that must be stored in the memory 172. This facilitates reducing the burden on the memory 172 and freeing up the memory space for other operations, thereby improving the performance of the clustering engine 170 and the overall system 100. Furthermore, this approach reduces the amount of data that must be transmitted over the network 130, thereby reducing the strain on the network 130 and alleviating any network bottlenecks.

In some embodiments, the clustering engine 170 uses a k-means clustering technique to de-duplicate and cluster the web traffic data 155.

Figure 5:
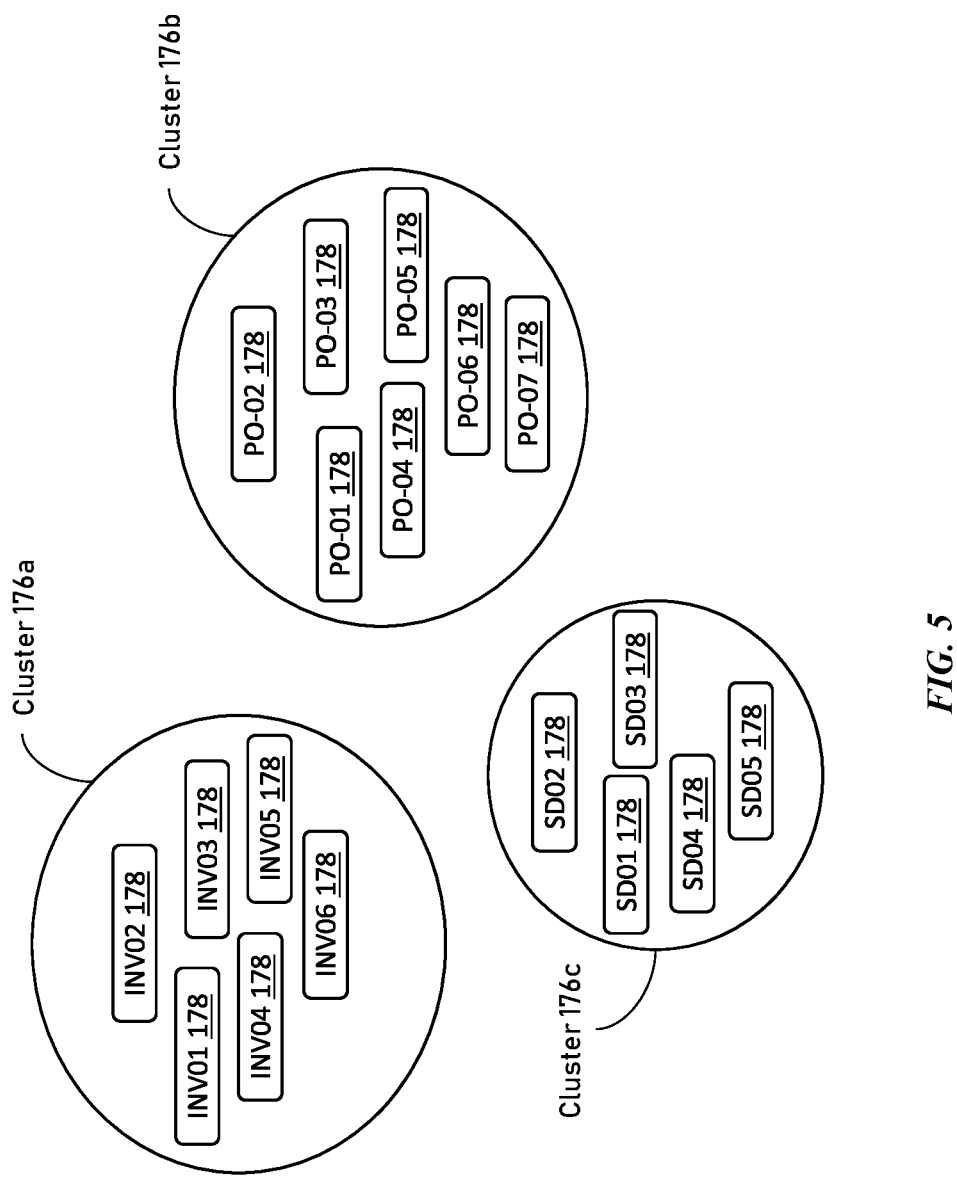
FIG. 5 illustrates an exemplary embodiment of multiple clusters of data elements, according to the present disclosure.

Clustering engine 170 is further configured to group the data elements 178 into a plurality of clusters 176. Each cluster 176 of data elements 178 is associated with a pre-defined data type 145. FIG. 5 illustrates an exemplary embodiment of multiple clusters 176a-c of data elements 178. A first cluster 176a includes a plurality of data elements 178 comprising invoices associated with the users 110. A second cluster 176b includes a plurality of data elements 178 comprising purchase orders associated with the users 110. A third cluster 176c includes a plurality of data elements 178 comprising shipping documents associated with the users 110.

Referring back to FIG. 1, leakage detection engine 180 is a special purpose computer configured to detect data leakage error 186, according to the embodiments of the present disclosure. Leakage detection engine 180 comprises one or more processors 182 and a memory 184 that implement the algorithm discussed herein. Specifically, the leakage detection engine 180 is configured to determine whether there is a data leakage error 186 in each of the clusters 176 of data elements 178 that were previously clustered by the clustering engine 170. For example, the leakage detection engine 180 may identify a first cluster 176 of data elements 178 associated with a first pre-defined data type 145 and identifies data elements 178 in the first cluster 176 that are associated with a first user 110. The leakage detection engine 180 further identifies a first allow table 142 that is associated with the first pre-defined data type 145 and identifies allowed data elements 146 in the first allow table 142 that are associated with the first user 110. The leakage detection engine 180 then compares the identified data elements 178 in the first cluster 176 to the identified allowed data elements 146 in the first allow table 142 and determines whether the identified data elements 178 in the first cluster 176 comprises at least one data element 178 that is not in the identified allowed data elements 146 in the first allow table 142. In response to determining that the identified data elements 178 in the first cluster 176 comprises at least one data element 178 that is not in the identified allowed data elements 146 in the first allow table 142, the leakage detection engine 180 determines that an error of data leakage 186 is detected for the first user 110 within the first cluster 176 of data elements 178 associated with the first pre-defined data type 145.

Figure 6:
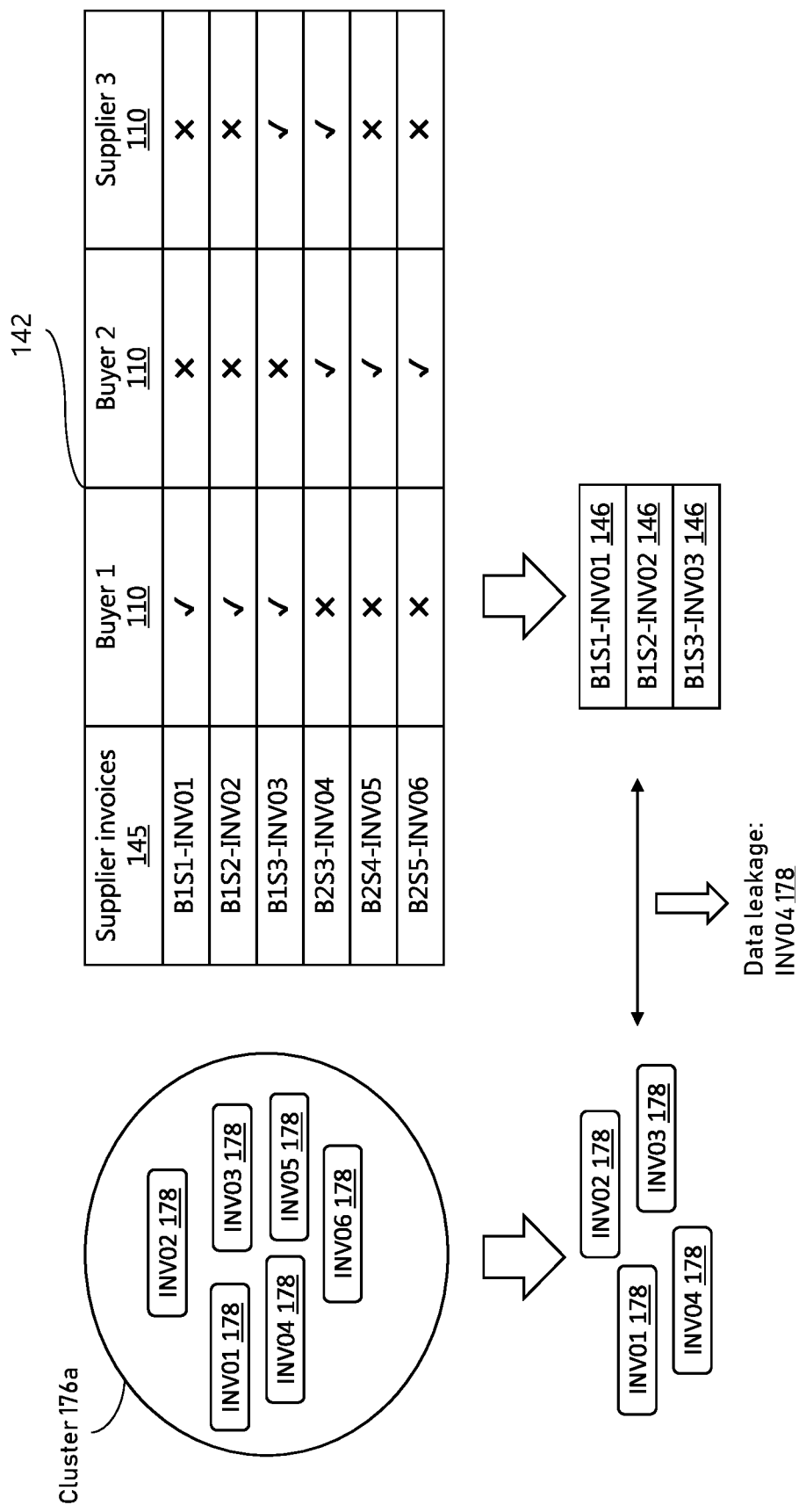
FIG. 6 illustrates an exemplary embodiment of detecting a data leakage, according to the present disclosure.

FIG. 6 illustrates an exemplary embodiment of detecting a data leakage 186, according to the present disclosure. As illustrated, the left-hand side of the figure illustrates a cluster 176a of data elements 178 including multiple invoices, such as for example, INV01-06. The leakage detection engine 180 may inspect the data elements 178 and determine that the data elements 178 including INV01-04 are associated with a first user 110, for example such as "buyer 1." These data elements 178 were previously extracted from the web traffic data 155 which means that they have been sent to the first user 110 "buyer 1." The leakage detection engine 180 then will determine whether these data elements 178 include any data that is not supposed to be sent to the first user 110. Specifically, on the right-hand side of FIG. 6, the leakage detection engine 180 identifies an allow table 142 that is associated with the data type 145 of invoice. Then, the leakage detection engine 180 identifies the allowed data elements 146 in the allow table 142 that are associated with the first user 110 "buyer 1." For example, the leakage detection engine 180 may identify the allowed data elements 146 including "B1S1-INV01," "B1S2-INV02," and "B1S3-INV03" that are associated with the first user 110 "buyer 1." The leakage detection engine 180 then compares the identified data elements 178 including INV01-04 to the identified allowed data elements 146 including "B1S1-INV01," "B1S2-INV02," and "B1S3-INV03." Note that here the data element "INV01" includes the same data as the allowed data element 146 "B1S1-INV01." Similarly, the data elements "INV02" and "INV03" include the same data as the allowed data elements 146 "B1S2-INV02" and "B1S3-INV03." After the comparison, the leakage detection engine 180 determines that the identified data elements 178 includes a data element 178 "INV04" that is not in the identified allowed data elements 146 for the first user 110 "buyer 1." Then, in response to determining that the identified data elements 178 comprises at least one data element 178 that is not in the identified allowed data elements 146, the leakage detection engine 180 determines that an error of data leakage 186 is detected for the first user 110 within the first cluster 176*a*.

The leakage detection engine 180 may continue to identify the data elements 178 in the first cluster 176*a* that are associated with other users 110 and determine whether there is an error of data leakage 186 for the other users 110 within the first cluster 176*a*. After inspecting the data elements 178 for all users 110 in the first cluster 176*a*, the leakage detection engine 180 may continue to examine the other clusters 176 to determine whether there is an error of data leakage 186 occurring in the other clusters 176.

The leakage detection engine 180 is further configured to determine whether a data leakage 186 is a false alarm 188. Specifically, the leakage detection engine 180 uses a supervised learning technique to classify whether a data leakage 186 is a false alarm 188. In some embodiments, the leakage detection engine 180 uses a random forest classification technique to determine whether a data leakage 186 is a false alarm 188. If the leakage detection engine 180 determines that the data leakage 186 is a false alarm 188, the leakage detection engine 180 will stop flagging the data leakage 186 as an error. For example, if the data leakage 186 specifies that sending a data element 178 to a user 110 is an error and the leakage detection engine 180 later determines that the data leakage 186 is a false alarm 188, the leakage detection engine 180 will stop flagging the event of sending the data element 178 to the user 110 as an error of data leakage 186. Furthermore, next time when the leakage detection engine 180 detects that the same data element 178 is sent to the user 110, the leakage detection engine 180 will not determine that this is an error of data leakage 186. This approach improves the accuracy of the detection of data leakage error 186.

Referring back to FIG. 1, system 100 further includes a web server 190 that is configured to communicate web traffic data 155 with user devices 120 over the network 130. The web server 190 is generally configured as a server to store, process, and store web data to users 110. Specifically, web server 190 is configured to receive HTTP requests 156 from the user devices 120 and send HTTP responses 157 to the user devices 120.

Figure 7:
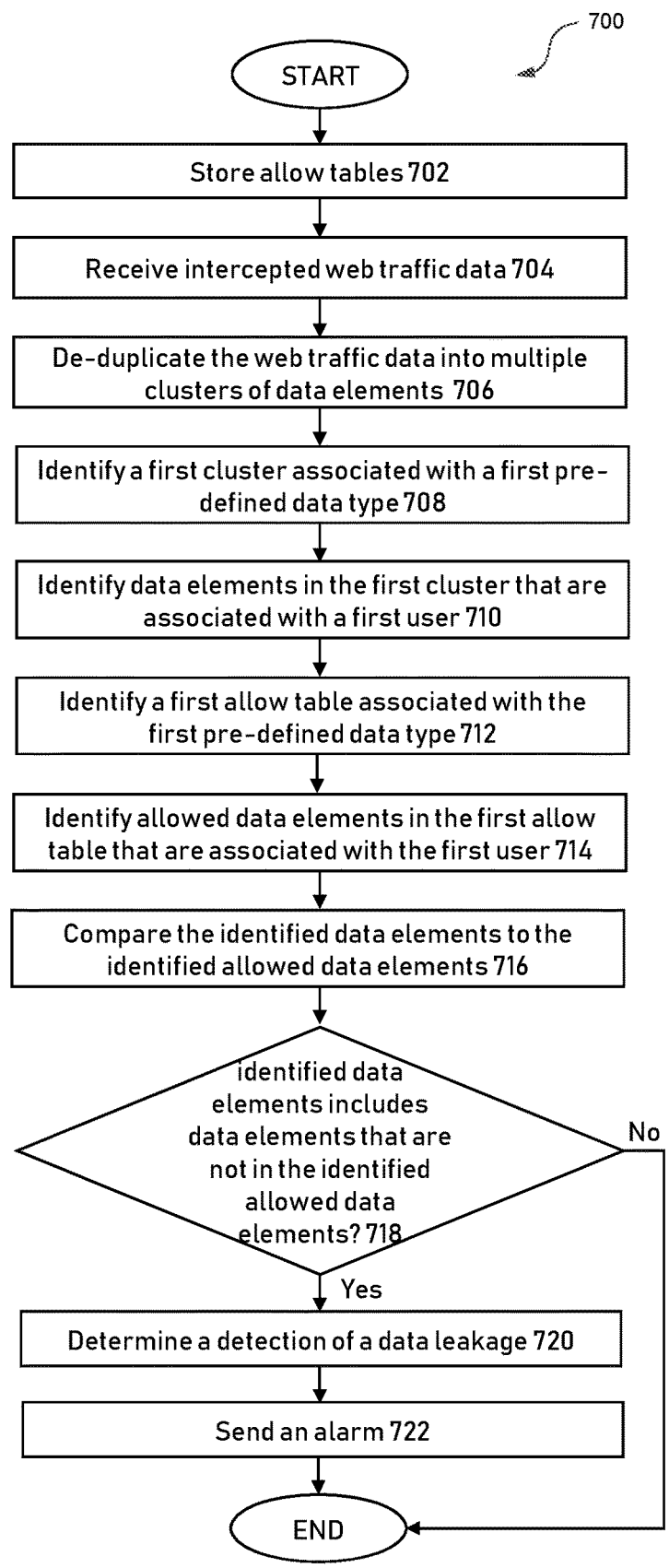
FIG. 7 illustrates a flow chart presenting an exemplary embodiment of a method of performing error detection of data leakage, according to the present disclosure.

FIG. 7 illustrates a flow chart presenting an exemplary embodiment of a method 700 of performing error detection of data leakage 186, according to the present disclosure. The following is a non-limiting example that illustrates how system 100 implements method 700.

Upon starting the process, system 100 pre-stores allow tables 142 at step 702. Each of the allow tables 142 includes a plurality of allowed data elements 146 associated with a pre-defined data type 145. Example pre-defined data types include invoices, purchase orders, and shipping documents. The allowed data elements 146 in an allow table 142 may be associated with a plurality of users 110 so that each user 110 is associated with a subset of the allowed data elements 146 in the allow table 142.

At step 704, system 100 receives intercepted web traffic data 155. The web traffic data 155 includes HTTP requests 156 and HTTP responses 157 that are communicated between users 110 and the web server 190 of the system 100. For example, the user 110 may send a series of HTTP requests 156 to the web server 190. In response to the HTTP requests 156, the web server 190 sends a series of HTTP responses 157 to the user device 120. The web traffic data 155 may be intercepted by the web interceptor 150 of system 100. The HTTP requests 156 and the HTTP responses 157 include data elements 178, such as for example, invoices, purchase orders, and shipping documents, that are transmitted between the users 110 and the web server 190. The web traffic data 155 including the HTTP requests 156 and the HTTP responses 157 may be further processed by the system 100 to extract the data elements 178.

At step 706, the system 100 de-duplicates the web traffic data 155 into multiple clusters 176 of data elements 178. For example, system 100 may extract the data elements 178 from the web traffic data 155 and remove the duplicate copies of the data elements 178. System 100 may further segregate the data elements 178 into a plurality of clusters 176 using a k-means clustering technique. Each cluster 176 of data elements 178 is associated with a pre-defined data type 145. For example, a first cluster 176 may include a plurality of data elements 178 comprising invoices associated with the users 110. A second cluster 176 may include a plurality of data elements 178 comprising purchase orders associated with the users 110. A third cluster 176 may include a plurality of data elements 178 comprising shipping documents associated with the users 110.

De-duplication reduces the amount of data that must be stored in the system 100. This facilitates reducing the burden on the memory space of the computers that implement the system 100 and freeing up the memory space for other operations, thereby improving the performance of the computers and the overall system 100. Furthermore, this approach reduces the amount of data that must be transmitted over the network 130, thereby reducing the strain on the network 130 and alleviating the network bottlenecks.

At step 708, the system 100 identifies a first cluster 176 associated with a first pre-defined data type 145. For example, the system 100 may identify a first cluster 176 including data elements 178 comprising invoices.

At step 710, the system 100 identifies data elements 178 in the first cluster 176 that are associated with a first user 110. The system 100 may inspect the data elements 178 in the first cluster 176 and identify a subset of the data elements 178 that are associated with the first user 110. These data elements 178 were previously extracted from the web traffic data 155 which means that they have been sent to the first user 110. The system 100 will then determine whether these data elements 178 include any data that is not supposed to be sent to the first user 110.

At step 712, the system 100 identifies a first allow table 142 associated with the first pre-defined data type 145. For example, the system 100 may identify an allow table 142 that is associated with the data type 145 of invoice.

At step 714, the system 100 identifies allowed data elements 146 in the first allow table 142 that are associated with the first user 110. For example, the system 100 may identify a subset of the allowed data elements 146 in the allow table 142 that are indicated to be relevant to the first user 110.

At step 716, the system 100 compares the identified data elements 178 as determined at step 710 to the identified allowed data elements 146 as determined at step 714.

At step 718, the system 100 determines whether the identified data elements 178 in the first cluster 176 comprises at least one data element 178 that is not in the identified allowed data elements 146 in the first allow table 142. If the system 100 determines that the identified data elements 178 in the first cluster 176 comprises at least one data element 178 that is not in the identified allowed data elements 146 in the first allow table 142, method 700 proceeds to step 720.

At step 720, the system 100 determines that a data leakage error 186 is detected in response to determining that the identified data elements 178 in the first cluster 176 comprises at least one data element 178 that is not in the identified allowed data elements 146 in the first allow table 142.

At step 722, the system 100 generates an alarm indicating that a data leakage error 186 is detected.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skill in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for detecting data leakage, comprising:
a memory configured to store:
a plurality of allow tables, each allow table comprising a plurality of allowed data elements of a pre-defined data type that are associated with a plurality of users;
a web interceptor configured to:
intercept web traffic data associated with the plurality of users, the web traffic data comprising a plurality of data elements, each data element being associated with a pre-defined data type;
a clustering engine configured to:
group the plurality of data elements into a plurality of clusters, each cluster corresponding to a pre-defined data type; and
a leakage detection engine configured to:
identify a first cluster of data elements associated with a first pre-defined data type;
identify data elements in the first cluster that are associated with a first user;
identify a first allow table that is associated with the first pre-defined data type;
identify allowed data elements in the first allow table that are associated with the first user;
compare the identified data elements in the first cluster to the identified allowed data elements in the first allow table;
determine whether the identified data elements in the first cluster comprises at least one data element that is not in the identified allowed data elements in the first allow table; and
in response to determining that the identified data elements in the first cluster comprises at least one data element that is not in the identified allowed data elements in the first allow table, determine that an error of data leakage is detected for the first user within the first pre-defined data type.

2. The system of claim 1, wherein the leakage detection engine is further configured to:
identify data elements in the first cluster that are associated with a second user;
identify allowed data elements in the first allow table that are associated with the second user;
compare the identified data elements in the first cluster that are associated with the second user to the identified allowed data elements in the first allow table that are associated with the second user;
determine whether the identified data elements in the first cluster that are associated with the second user comprises at least one data element that is not in the identified allowed data elements in the first allow table that are associated with the second user; and
in response to determining that the identified data elements in the first cluster that are associated with the second user comprises at least one data element that is not in the identified allowed data elements in the first allow table that are associated with the second user, determine that an error of data leakage is detected for the second user within the first pre-defined data type.

3. The system of claim 1, wherein the allowed data elements in an allow table comprise:
a plurality of invoices;
a plurality of purchase orders; or
a plurality of shipping documents.

4. The system of claim 1, wherein the clustering engine is further configured to de-duplicate the web traffic data by eliminating duplicate copies of the data elements of the web traffic data.

5. The system of claim 1, wherein grouping the plurality of data elements into a plurality of clusters comprises clustering the plurality of data using a k-means clustering technique.

6. The system of claim 1, wherein the memory is further configured to store the web traffic data for the plurality of users.

7. The system of claim 1, wherein the web interceptor is implemented within a Kafka framework.

8. A non-transitory computer-readable medium storing logic that when executed by one or more processors, cause the one or more processors to:
- store a plurality of allow tables, each allow table comprising a plurality of allowed data elements of a pre-defined data type that are associated with a plurality of users;
- intercept web traffic data associated with the plurality of users, the web traffic data comprising a plurality of data elements, each data element being associated with a pre-defined data type;
- group the plurality of data elements into a plurality of clusters, each cluster corresponding to a pre-defined data type;
- identify a first cluster of data elements associated with a first pre-defined data type;
- identify data elements in the first cluster that are associated with a first user;
- identify a first allow table that is associated with the first pre-defined data type;
- identify allowed data elements in the first allow table that are associated with the first user;
- compare the identified data elements in the first cluster to the identified allowed data elements in the first allow table;
- determine whether the identified data elements in the first cluster comprises at least one data element that is not in the identified allowed data elements in the first allow table; and
- in response to determining that the identified data elements in the first cluster comprises at least one data element that is not in the identified allowed data elements in the first allow table, determine that an error of data leakage is detected for the first user within the first pre-defined data type.

9. The non-transitory computer-readable medium of claim 8, wherein the logic, when executed by the one or more processors, further instructs the one or more processors to:
- identify data elements in the first cluster that are associated with a second user;
- identify allowed data elements in the first allow table that are associated with the second user;
- compare the identified data elements in the first cluster that are associated with the second user to the identified allowed data elements in the first allow table that are associated with the second user;
- determine whether the identified data elements in the first cluster that are associated with the second user comprises at least one data element that is not in the identified allowed data elements in the first allow table that are associated with the second user; and
- in response to determining that the identified data elements in the first cluster that are associated with the second user comprises at least one data element that is not in the identified allowed data elements in the first allow table that are associated with the second user, determine that an error of data leakage is detected for the second user within the first pre-defined data type.

10. The non-transitory computer-readable medium of claim 8, wherein the allowed data elements in an allow table comprise:
- a plurality of invoices;
- a plurality of purchase orders; or
- a plurality of shipping documents.

11. The non-transitory computer-readable medium of claim 8, wherein the logic, when executed by the one or more processors, further instructs the one or more processors to de-duplicate the web traffic data by eliminating duplicate copies of the data elements of the web traffic data.

12. The non-transitory computer-readable medium of claim 8, wherein grouping the plurality of data elements into a plurality of clusters comprises clustering the plurality of data using a k-means clustering technique.

13. The non-transitory computer-readable medium of claim 8, wherein the memory is further configured to store the web traffic data for the plurality of users.

14. The non-transitory computer-readable medium of claim 8, wherein the web interceptor is implemented within a Kafka framework.

15. A method for detecting data leakage, comprising:
- storing a plurality of allow tables, each allow table comprising a plurality of allowed data elements of a pre-defined data type that are associated with a plurality of users;
- intercepting web traffic data associated with the plurality of users, the web traffic data comprising a plurality of data elements, each data element being associated with a pre-defined data type;
- grouping the plurality of data elements into a plurality of clusters, each cluster corresponding to a pre-defined data type;
- identifying a first cluster of data elements associated with a first pre-defined data type;
- identifying data elements in the first cluster that are associated with a first user;
- identifying a first allow table that is associated with the first pre-defined data type;
- identifying allowed data elements in the first allow table that are associated with the first user;
- comparing the identified data elements in the first cluster to the identified allowed data elements in the first allow table;
- determining whether the identified data elements in the first cluster comprises at least one data element that is not in the identified allowed data elements in the first allow table; and
- in response to determining that the identified data elements in the first cluster comprises at least one data element that is not in the identified allowed data elements in the first allow table, determining that an error of data leakage is detected for the first user within the first pre-defined data type.

16. The method of claim 15, wherein the method further comprises:
- identifying data elements in the first cluster that are associated with a second user;
- identifying allowed data elements in the first allow table that are associated with the second user;
- comparing the identified data elements in the first cluster that are associated with the second user to the identified allowed data elements in the first allow table that are associated with the second user;
- determining whether the identified data elements in the first cluster that are associated with the second user comprises at least one data element that is not in the identified allowed data elements in the first allow table that are associated with the second user; and in response to determining that the identified data elements in the first cluster that are associated with the second user comprises at least one data element that is not in the identified allowed data elements in the first allow table that are associated with the second user, determining that an error of data leakage is detected for the second user within the first pre-defined data type.

17. The method of claim 15, wherein the allowed data elements in an allow table comprise:

a plurality of invoices;

a plurality of purchase orders; or a plurality of shipping documents.

18. The method of claim 15, further comprising de-duplicating the web traffic data by eliminating duplicate copies of the data elements of the web traffic data.

19. The method of claim 15, wherein grouping the plurality of data elements into a plurality of clusters comprises clustering the plurality of data using a k-means clustering technique.

20. The method of claim 15, wherein the web interceptor is implemented within a Kafka framework.

* * * * *